United States Patent

Weinreich

[11] Patent Number: 5,810,469
[45] Date of Patent: Sep. 22, 1998

[54] COMBINATION LIGHT CONCENTRATING AND COLLIMATING DEVICE AND LIGHT FIXTURE AND DISPLAY SCREEN EMPLOYING THE SAME

[76] Inventor: Steve Weinreich, 14 Norton Rd., Monmouth Jct., N.J. 08852

[21] Appl. No.: 37,441

[22] Filed: Mar. 26, 1993

[51] Int. Cl.⁶ ..................................................... F21V 7/12
[52] U.S. Cl. ........................... 362/298; 362/304; 362/346; 362/302; 362/303
[58] Field of Search .............................. 362/398, 61, 245, 362/247, 268, 297, 346, 347, 349, 241, 298, 301, 302, 304, 305; 359/48, 49, 50; 349/64, 70

[56] References Cited

U.S. PATENT DOCUMENTS

| | | | |
|---|---|---|---|
| 25,421 | 9/1859 | Knapp | 362/298 X |
| 804,996 | 11/1905 | Anthony . | |
| 1,703,494 | 2/1929 | Lewis | 362/298 X |
| 2,285,408 | 6/1942 | Blauvelt | 362/280 |
| 2,589,569 | 3/1952 | Peter et al. | 362/32 |
| 2,686,866 | 8/1954 | Williams . | |
| 3,306,974 | 2/1967 | Cunnally | 359/615 X |
| 3,731,991 | 5/1973 | Arnold . | |
| 4,621,443 | 11/1986 | Weinreich . | |
| 4,686,519 | 8/1987 | Yoshida et al. . | |
| 4,735,495 | 4/1988 | Henkes | 359/49 X |
| 4,757,626 | 7/1988 | Weinreich . | |
| 4,765,718 | 8/1988 | Henkes | 359/49 X |
| 4,798,448 | 1/1989 | Van Raalte | 362/268 X |
| 4,915,479 | 4/1990 | Clarke | 359/49 |
| 4,956,759 | 9/1990 | Goldenberg et al. | 362/347 |
| 4,984,872 | 1/1991 | Vick | 359/50 X |
| 5,075,993 | 12/1991 | Weinreich . | |
| 5,128,783 | 7/1992 | Abileah et al. . | |
| 5,267,062 | 11/1993 | Bottorf | 359/49 X |
| 5,335,158 | 8/1994 | Kaplan et al. | 362/303 |

*Primary Examiner*—Thomas M. Sember
*Attorney, Agent, or Firm*—Richard A. Steinberg

[57] ABSTRACT

The present invention is directed toward a light concentration and collimation device including a tapered body concentrator and a curved, preferably parabolic, reflective collimator combined in a unit such that the apex of the tapered body extends into the reflective collimator through its apex. The concentrator is preferably hollow with a reflective inner surface to funnel light from the base to the apex where an aperture allows the concentrated light to enter the collimator proximate to its focus. The light is then reflected from the inner surface of the collimator to form a beam of collimated light. The concentration and collimation device is particularly useful in visual display apparatus and may be combined with a spectral peak light source and a spectral distributor to produce individual collimated beams of light at specific wavelengths.

34 Claims, 5 Drawing Sheets

COMBINATION LIGHT CONCENTRATING AND COLLIMATING DEVICE AND LIGHT FIXTURE AND DISPLAY SCREEN EMPLOYING THE SAME

BACKGROUND OF INVENTION

The present invention relates to a combination light concentration and collimation device, and apparatus employing such a device, which serves to concentrate a light beam and produce a narrow collimated beam from a wider, non-collimated source. Narrow beams of light are desired in several instances such as where a narrow spot is required for precise illumination of a small area. Most recently, in display technology, the problem of increasing the brightness and contrast of a display image while decreasing the power requirements of the device has been of great importance in the development of low power alternatives to CRT displays.

Cone concentrators, as generally known, have characteristics which limit their effectiveness in various applications. For example, compound parabolic concentrators such as those described by Welford and Winston in *The Optics of Nonimaging Concentrators* (Academic Press, 1978) produce widely diverging outputs including output rays at 90° from the concentrator axis. These devices do not produce collimated light.

Other devices which do produce a collimated light output require the light input to be collimated, such as the output of a laser device (U.S. Pat. No. 3,731,991, Arnold), or light from a distant object entering a telescope (U.S. Pat. No. 804,996, Anthony) and serve only to adjust the diameter of the already collimated or parallel beam.

Still other devices may provide conical reflective structures but do not concentrate light or produce a collimated beam output. For example, U.S. Pat. No. 2,686,866, Williams, presents a color mixing lighting apparatus which employs truncated conical or pyramidal reflecting surfaces arranged in opposing relationships with different colored light sources at the input to mix the colors and thereby obtain different hues.

As noted above, the problem of obtaining a brighter display output and higher contrast with lower power requirements has become very important. This is particularly true since the advent of liquid crystal display use in the computer field. Increased brightness and contrast have been achieved by increasing the brightness of the source providing the light striking the LCD elements and by the use of active matrix elements, both of which have increased power requirements. LCD displays usually employ color filters to provide the required wavelength of light striking the elements or to generate color in the image emitted by the display. Filters, by their nature, tend to reduce the brightness of the light passing through them due to absorption and it would be preferable to be able to do away with them. However, there still must be a way to provide the desired wavelengths of light to the LCD elements.

Yoshida, et al., in U.S. Pat. No. 4,686,519, disclose a multicolor picture display which proposes to eliminate the filter commonly used by concentrating light from a source then refracting it into the three color components red, green and blue. These colors are then presented directly to sub-pixels specific for the respective colors. However, Yoshida, et al., obtain the concentrated beam from already collimated white light by passing it first through concentrating elements in the form of lenses to narrow the beam prior to refraction by a prism system. In actuality, such a structure, using ordinary collimated white light, will produce a continuous spectrum not just the three component colors, as appears to be suggested by Yoshida, et al., and the continuous spectrum will then be presented to the pixels. In this case, unwanted portions of the spectrum may be incident on the sub-pixel light valves representing the primary colors. As noted already, the Yoshida, et al. patent discloses the light being used as already collimated without presenting any means to obtain such collimation. The patent discloses a "scattering plate" to convert non-collimated light to collimated light but provides no explanation as to what this element is or how it achieves this result. Known methods of producing collimated light for use with the Yoshida, et al., device would ordinarily require a depth several times greater than the breadth of a display rendering it unsuitable for portable displays. Furthermore, the use of prisms adds to the required depth.

The present invention presents a cervical concentrator collimator apparatus which preferably employs purely reflecting surfaces for both concentration of non-collimated incoming light and for collimation of the concentrated light into a narrow collimated output beam. In addition, the present invention provides a display assembly employing the concentrating and collimating apparatus in combination with a spectral peak light source, a spectral distributor and renormalizing means which achieves improved display brightness and color quality over currently available systems.

SUMMARY OF INVENTION

It is an object of this invention to provide a combination light concentration and collimation means which produces a narrow beam of collimated light from a non-collimated source.

It is a further object to provide a combination light concentration and collimation means having utility in light fixtures and display technology.

It is a still further object to provide an improved color display means incorporating the combination light concentration and collimation means of the present invention.

Further objects and advantages will become evident from the following description and drawing figures.

In the preferred form of the present invention a tapered concentrator gathers non-collimated light from a source and concentrates it. The output of the concentrator coincides with the focus of a parabolic reflector so that divergent rays of light emanating from the concentrator impinge on the reflective surface of the parabolic reflector and are redirected to be parallel to the axis of the collimator. In its simplest form the concentrator is a hollow cone having a reflective inner surface and a truncated tip. The parabolic reflector is positioned over the narrow end of the cone so that the truncated tip is within the reflector at its focus and the open end of the reflector points away from the apex of the cone. This structure forms a cervical concentrator collimator device of this invention. Light rays from a light source enter the cone at its base and are reflected within the cone along its length to emerge through the aperture at the tip. Some rays pass through the cone without being reflected off the interior. These rays may likewise pass through the parabolic reflector without effect, as may some of the reflected rays. However, many of the light rays entering the concentrator are reflected down to the aperture and emerge into the parabolic reflector at larger angles to the axis. Many of these rays, entering the parabolic reflector at its focus, reflect off the walls of the reflector so as to then be parallel to the axis of the concentrator. In this manner, the beam exiting from the parabolic reflector is a largely collimated beam. Furthermore, by making the base of the concentrator of a large size and the parabolic reflector of a smaller size, the resulting collimated beam is narrower than the area from which light is collected.

Applications where the cervical concentrator collimator structure of the present invention may find utility include light fixtures and visual display apparatus such as portable computer LCD display screens. In such display apparatus, light rays more normal to the transparent surface are reflected less strongly, thereby putting more power through the surface and a narrower angle beam can be intercepted by a smaller light valve or at a greater distance from the concentrator output. Known methods of collimation do not lend themselves to collimating light emanating from a distributed (i.e., over a relatively large area) diffuse light source also commonly referred to in the art as extended diffuse light source, such as an elongated or curved fluorescent light bulb or an array or bank of such lights. For example, it has not been known how to direct light from such distributed diffuse light source also commonly referred to in the art as extended diffuse light source to the focus of a parabolic reflector or lens.

The present invention, in one aspect thereof, provides a solution to this problem. Specifically, the present invention provides a device for providing collimated light from a distributed diffuse light source, such as a plurality of fluorescent light bulbs. This collimating device includes a distributed diffuse light source, and an array of collimating elements disposed to receive the diffuse light emanating from the light source and largely collimating same. As used herein and in the appended claims the term "largely" in the phrase "largely collimating same" or equivalent language, is used to mean that the collimation is not perfect, but is nevertheless significant. Also, although much of the light emanating from the source may not pass through the collimating device, the advantages of collimating may more than offset the loss of light.

The collimating device according to this aspect of the invention is particularly useful in connection with flat screen displays. The collimating array of the collimating device for illuminating the flat screen display or other type of light valve array has the advantage of also being relatively flat. Specifically, the distance through which collimation is effected in the array of collimating elements is less than the breadth of the array. The collimating elements of the array may be, for example, any of the cervical concentrator collimator structures as defined above.

Light fixtures which emit a narrow spot beam may be constructed with the cervical concentrator collimator structure of the present invention forming the housing of the fixture to provide a self contained collimated light source. In this embodiment, the light source, which may be a bulb, is positioned within the concentrator body, a curved reflector being located behind the bulb to close the base of the concentrator. The parabolic reflector is positioned about the apex of the concentrator so that light exiting the concentrator at the parabolic reflector's focus is redirected to form a narrow collimated beam.

A visual display assembly employing the cervical concentrator collimator structure of the present invention comprises a light source, a multiplicity of cervical concentrator collimator elements which are arranged in an array, a spectral distributor and a display screen having an array of light valves which are preferably liquid crystal light valves. In this assembly, preferably there is one cervical concentrator collimator element for every three light valves and it provides a collimated beam which is separated by the spectral distributor into the selected wavelength components for delivery to the light valves thereby allowing elimination of color filters. The display assembly further preferably comprises a light source which emits light having particular spectral peaks corresponding to the specific wavelengths to be applied to the light valves.

DESCRIPTION OF PREFERRED EMBODIMENTS

Figure 1:
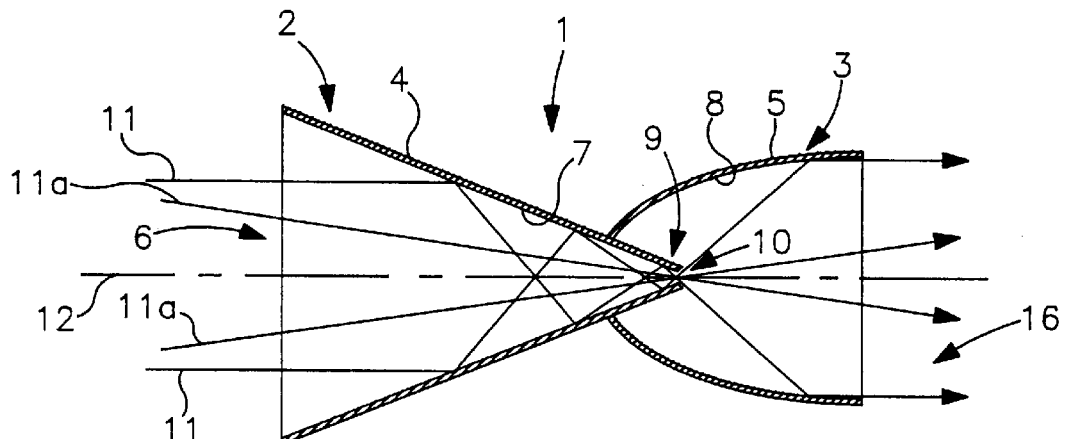
FIG. 1 is an axial cross section of a first embodiment of the cervical concentrator collimator of the present invention.

A key feature of the present invention is the cervical concentrator collimator device which is shown in a basic form in FIG. 1. This device is an improvement over the class of objects generally known as cone concentrators which includes varieties such as the compound parabolic concentrators referred to previously. The cervical concentrator collimator 1 has a concentrator input section 2 and a collimator output section 3 with the concentrator section 2 comprising a tapered body 4, generally a cone, and the collimator output section 3 being preferably a parabolic reflector 5. The concentrator 2 and collimator 3 are assembled in a preferably axial relationship with the apex 9 of the concentrator 2 passing through the apex of the collimator 3.

Preferably, the tapered body 4 is hollow with an open base 6 and a reflective interior 7. The reflective material is also preferably one that provides as close to 100% reflectance as possible and may comprise the material of the tapered body 4 if it is reflective or a separate layer of material applied to the body 4 if the body material is not itself reflective. For example, vacuum deposited aluminum typically has a reflectance of about 85–90%. The parabolic reflector 5 is similarly hollow, its inner surface 8 also being reflective, preferably to as high a degree as the reflective interior 7 of the tapered body 4 and comprising the same material.

At the apex 9 of the tapered body 4 is an aperture 10, which in the embodiment of FIG. 1 is formed by truncating the tapered end of the body 4. This aperture 10 is proximate to the focus of the parabolic reflector 5 and allows light entering the concentrator 2 at the base 6 to exit into the collimator 3. Representative light rays 11 are shown to indicate the path taken by light through the device. Preferably all rays are reflected by the inner surface 7 of the truncated body 4 and concentrated to exit at the aperture 10. However, some skew rays, represented as 11*a*, enter the concentrator 2 and pass through the collimator 3 without impinging thereon. They can be intercepted and redirected to impinge on the collimator in a manner to be shown later. The concentrated light rays 11 exit the truncated body at aperture 10 and are reflected by the inner surface 8 of the parabolic reflector 5. Because the aperture 10 is positioned proximate to the focus of the parabolic reflector 5, the concentrated rays strike the reflector surface 8 in a manner which results in the beam 16 emitted from the parabolic reflector 5 being formed of generally parallel rays and thus being largely collimated light.

Figure 3:
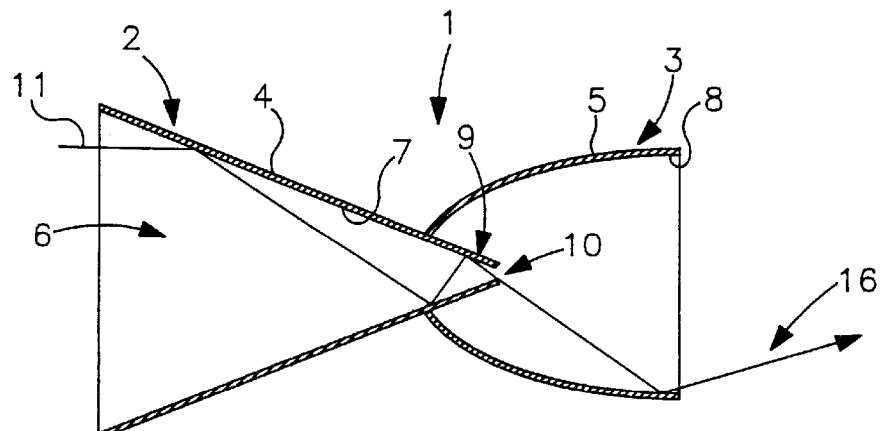
FIG. 3 is an axial cross section of a further modification of the device of FIG. 1 which produces a converging beam.
Figure 4:
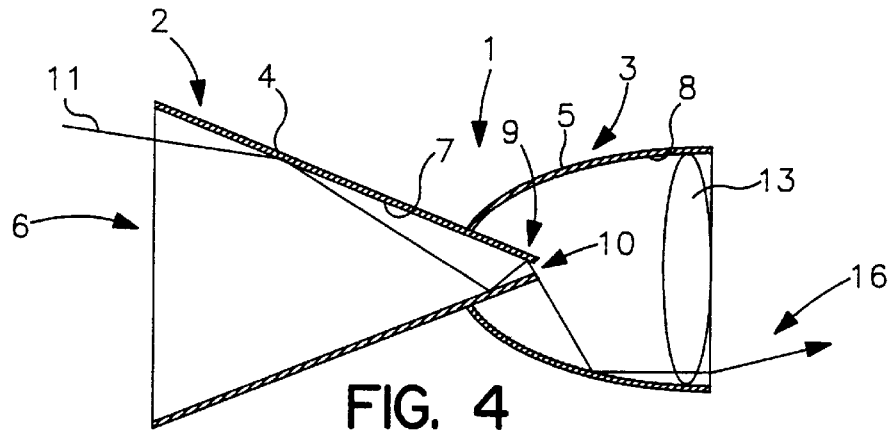
FIG. 4 is an axial cross section of a still further modification of the device of FIG. 1 including a lens to produce a converging beam.

The degree of collimation of the emitted beam is dependent on the ratio of the concentrator output size, that is the aperture 10, and the size of the collimator 3, particularly the diameter in relation to the length. A small aperture 10 coupled with a long collimator 3 provides the best results for a narrow collimated beam. In most applications it is preferred that the output of the collimator 3 be smaller than the input of the concentrator 2. In some cases it may be desired to confine the beam over a short distance; in such instances the output section of the device can be modified to cause the output beam to converge. This can be achieved by positioning the concentrator output aperture 10 further downstream of the collimator focus as shown in FIG. 3. Alternatively, a lens 13 positioned in the collimator 3 as shown in FIG. 4 may also be used to modify the beam.

It is generally not preferred to use a lens as part of the cervical concentrator collimator device 1 even though it is within the spirit of this invention. The choice of lens materials is generally limited and they may introduce aberrations in the light beam.

It is preferred that the cervical concentrator collimator 1 structure be hollow with a reflective interior such that the entire light path is reflective and it is preferably fabricated from molded polycarbonate with a vacuum deposited aluminum coating, but may also be made from highly polished metals, such as aluminum. The vacuum deposited aluminum coating may be applied to the inner surface of a hollow body or the outer surface of a transparent solid body so that the inner body is reflective. In this structure the cervical concentrator collimator 1 may be hollow with the coating preferably on the inner surface, or it may be solid with the reflective coating on the outer surface so that light passing through the cervical concentrator collimator 1 body is reflected within it. The hollow structure is preferred to minimize weight and volume of material and to accommodate certain manufacturing techniques although the maximum theoretical concentration of light is generally higher in solid concentrators. Transparent materials may include optical quality glass or plastics, such as polycarbonate, acrylic, allyl diglycol carbonate, and the like, with the reflective quality being achieved by a high degree of polishing of the mold in which the structure is formed and by application of metallic layers such as aluminum applied through such processes as vacuum metallizing or the like to achieve a highly reflective thin coating. In short, any material which will provide high reflectance may be used to make the cervical concentrator collimator 1 of this invention.

Figure 2:
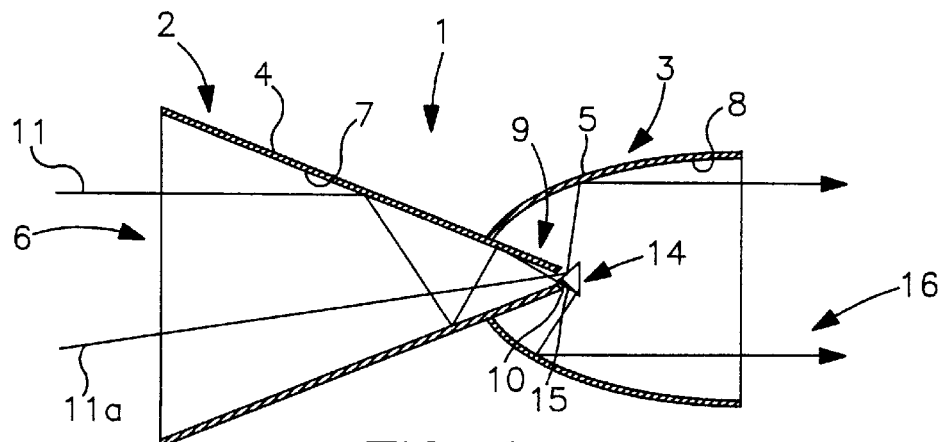
FIG. 2 is an axial cross section of a modified form of the device of FIG. 1 including a reflective member for redirecting light rays passing through the concentrator so that they impinge on the collimator.

The first embodiment of the cervical concentrator collimator 1 does not affect those skew rays 11*a* which may pass directly through the concentrator 2 and collimator 3 or which exit aperture 10 at an insufficient angle to impinge on the reflective surface 8 of the parabolic reflector 5. This may present problems especially where the collimator 3 is short relative to its output size. To overcome this problem, a reflective member 14 is positioned at the output of the concentrator 2 to intercept skew rays 11*a* and direct them to the surface 8 of the preferably parabolic reflector 5. In the embodiment illustrated in FIG. 2, the reflective element 14 is conically shaped with an apex 15 pointed toward aperture 10 in the truncated tip of the tapered body 4. As shown in FIG. 2, the representative light rays 11 and 11*a* are intercepted by the reflective member 14 such that light exiting through the aperture 10 is directed to the reflective surface 8 of the parabolic reflector 5. In this manner, light which would not normally impinge on the collimator 3 can be made to do so. This embodiment produces a hollow beam which is useful where it is used to impinge upon a single switching element or a regular pattern of switching elements.

The reflective member 14 can also be used to change the apparent size of the concentrator output. By altering the distance between the reflective member 14 and the aperture 10 at the truncated end of the tapered body 4, the apparent source size of the light beam entering the collimator 3 changes. Thus, if the reflective member 14 is positioned close to the aperture 10, the effect will be to render the aperture 10 as a narrow slot, the source size of the beam being the width of that slot.

Figure 5:
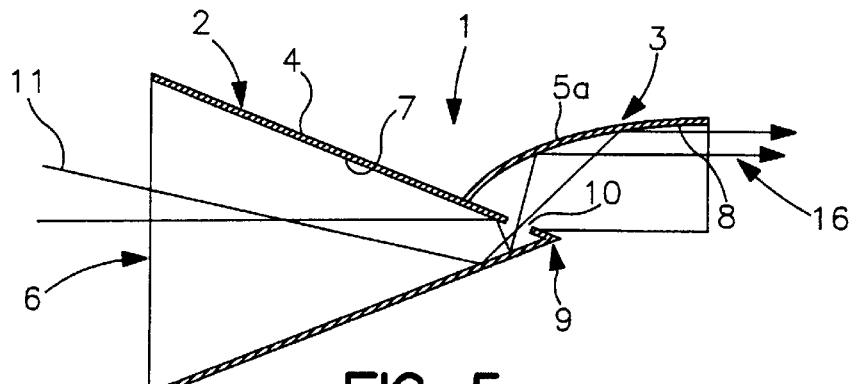
FIG. 5 is an axial cross section of a second embodiment of the cervical concentrator collimator of the present invention.

A smaller, tighter collimator output beam without a hollow center can be created by directing the concentrator output to a limited area of the collimator surface 8. This can be accomplished by a skewed concentrator output and/or by use of an asymmetrical reflective member. FIG. 5 illustrates a basic form of a cervical concentrator collimator 1 with an output beam 16 that is displaced relative to the axis 12 of the concentrator 2. In this embodiment, the tapered body 4 continues to a closed apex 9 with an aperture 10 formed in a confined area of the body wall adjacent to the apex 9. Since the aperture 10 only covers a portion of the area of the body wall, the collimator 3 need only be a partial arc parabolic reflector 5*a* forming a hood over that area. With this embodiment, light rays 11 enter the base of the tapered body and are reflected to the apex. Only those light rays achieving the correct angle to pass through the aperture 10, enter the collimator 3, and reflect off the surface 8. The efficiency of the cervical concentrator collimator may be enhanced by the inclusion of means such as multiple apertures (such as 10*a*, 10b in FIG. 6) and internal reflectors (such as 14 in FIG. 7) as discussed hereinafter.

By these or similar means the size of the collimated output beam 16 may be controlled regardless of the size of the input or base 6 of the tapered body 4. The size or position of aperture 10 may be determined and fixed at the time of manufacture for specific applications or it may be made variable as by providing means to move reflective body 14 relative to aperture 10.

Figure 6:
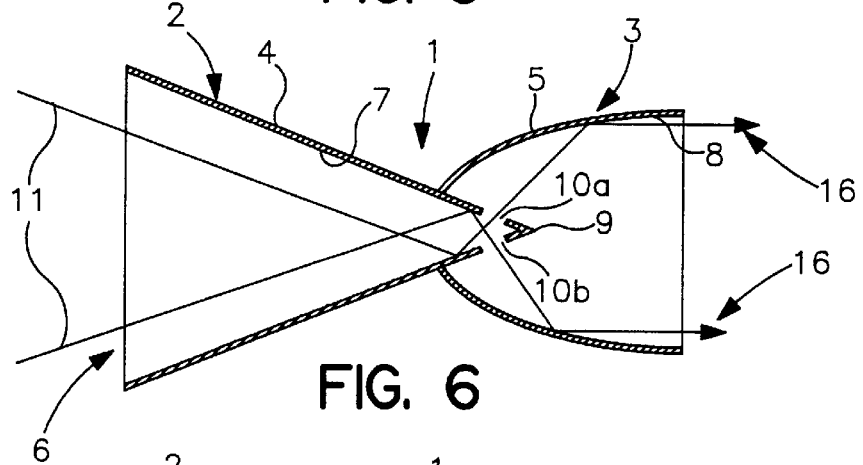
FIG. 6 is an axial cross section of a third embodiment of the cervical concentrator collimator of the present invention which produces multiple beams.

Multiple beams can be produced using the modification of this embodiment depicted in FIG. 6. Here, the concentrator is provided with at least two separate apertures 10a and 10b circumferentially spaced about the apex 9 of the tapered body 4. In this embodiment the collimator 3 is again a full parabolic reflector 5 rather than the limited arc reflector 5a of FIG. 5. However, it is envisioned that individual partial arc reflectors 5a having parabolic reflecting surfaces 8 could be used for each of such separate apertures 10a and 10b.

Figure 7:
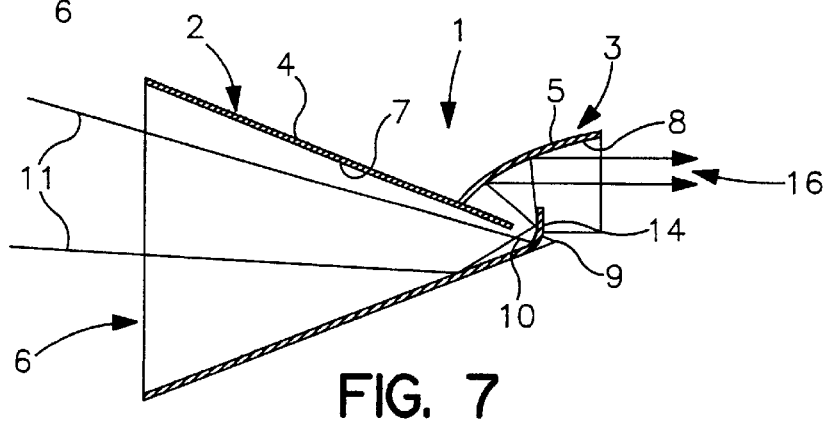
FIG. 7 is an axial cross section of a modification of the device of FIG. 5 and including a reflective member to redirect light rays passing through the concentrator so that they impinge on the collimator.

As in the embodiment of FIG. 2, symmetrical or asymmetrical reflective members 14 can also be used with the cervical concentrator collimator of FIGS. 5 and 6 as shown in FIG. 7. In this embodiment the reflective member 14 is positioned either at the forward edge of the aperture 10 or it may include a portion which extends through the aperture 10 into the tapered body 4. Either way, the reflective member 14 functions to redirect light rays passing through the tapered body 4 onto the reflective surface 8 of the collimator 3 to form a narrower or more completely collimated output beam 16.

Figure 8:
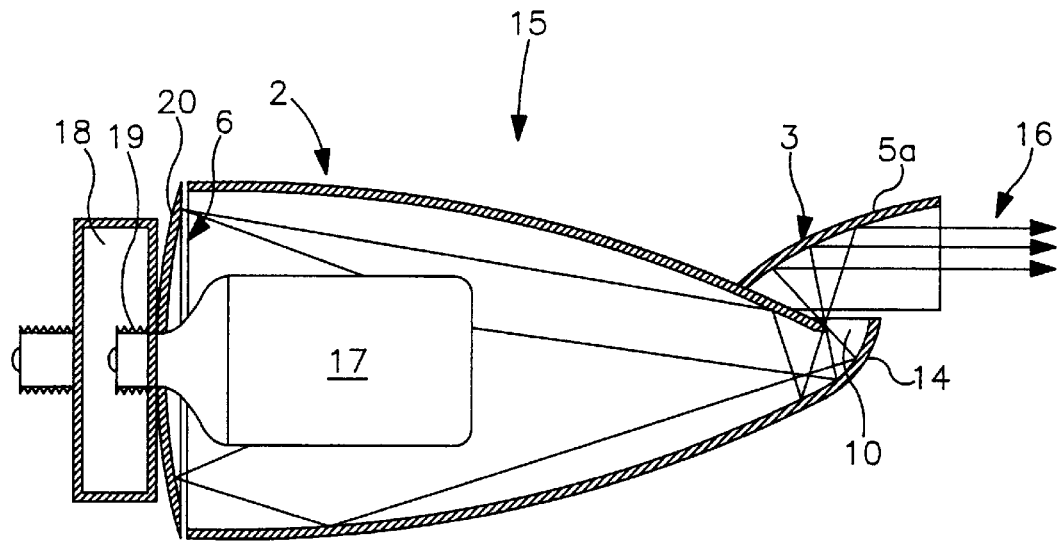
FIG. 8 is an axial cross section of a self contained collimated light source apparatus incorporating the cervical concentrator collimator of the present invention.
Figure 9:
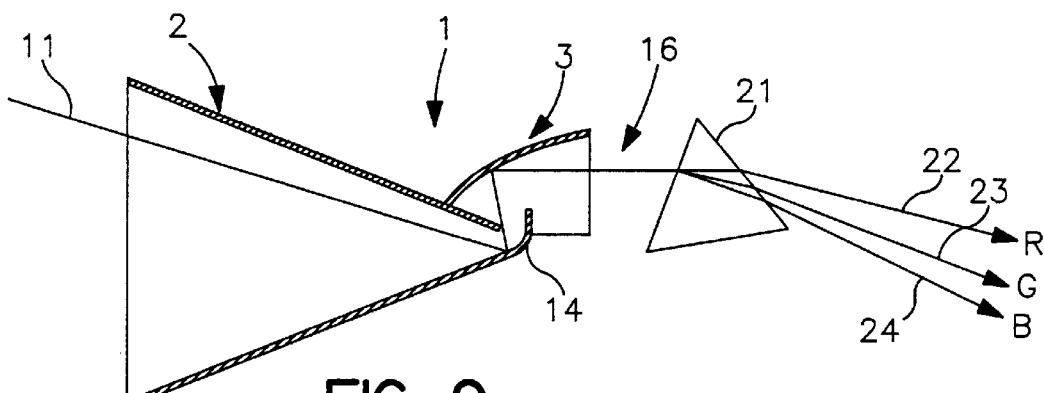
FIG. 9 is an axial cross section of the cervical concentrator collimator of the present invention in combination with a light refraction element.
Figure 10:
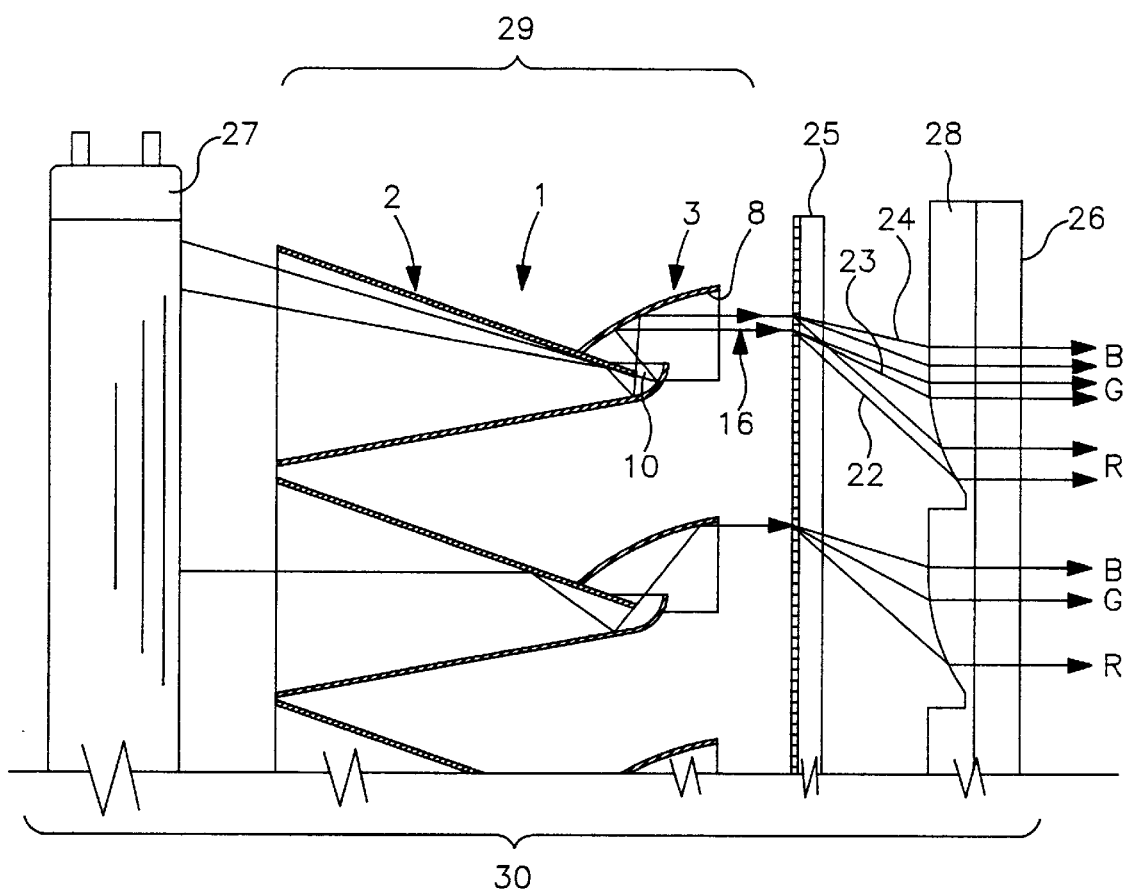
FIG. 10 is a partial cross sectional view of a display device according to the present invention incorporating an array of cervical concentrator collimators in combination with a diffraction grating spectral distributor.
Figure 11:
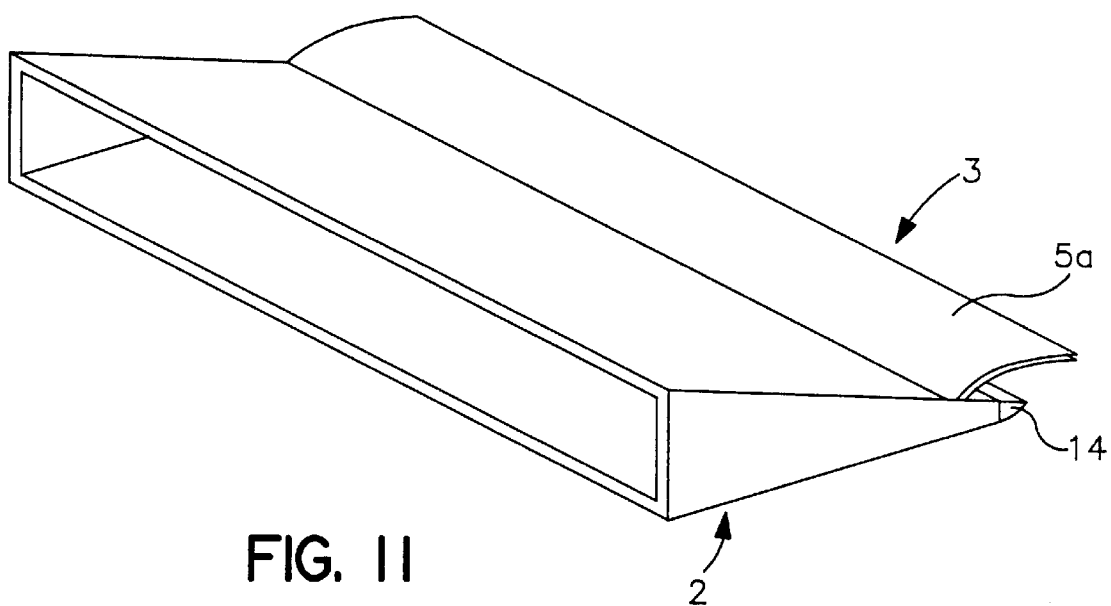
FIG. 11 is an oblique view of a trough type cervical concentrator collimator according to the present invention.

In terms of construction, this form of the device may also be formed from the truncated version of the tapered body 4 by extending a portion of the body wall to curve upward in front of the truncation aperture 10 thereby leaving a slot aperture across only a portion of the apex 9. This type of construction is illustrated in FIGS. 8, 9 and 10 and is particularly suitable to the trough type concentrator of FIG. 11.

Figure 12:
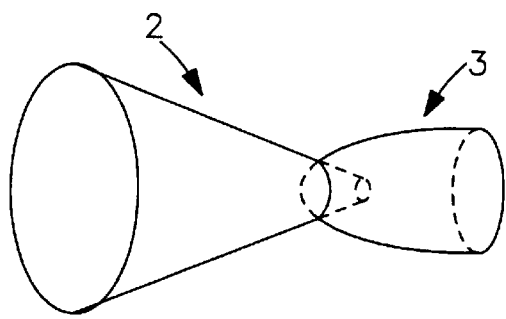
FIG. 12 is an oblique view of a cervical concentrator collimator according to the present invention wherein the concentrator is conical.
Figure 13:
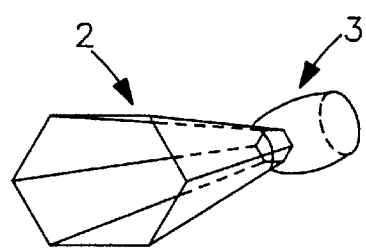
FIG. 13 is an oblique view of a cervical concentrator collimator according to the present invention wherein the concentrator has a hexagonal cross section.
Figure 14:
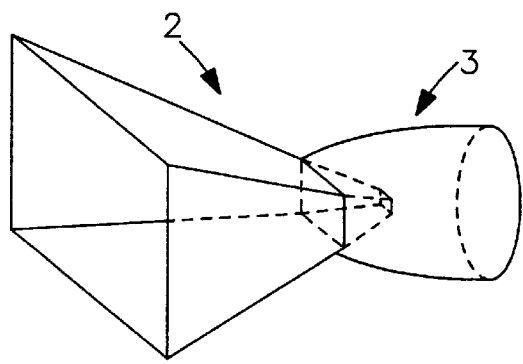
FIG. 14 is an oblique view of a cervical concentrator collimator according to the present invention wherein the concentrator is in the form of a pyramid.

Although the principal form of the concentrator 2 so far described is considered conical, as shown in FIG. 12, the device is adaptable to other tapered shapes. These include an elongated trough as in FIG. 11 which is illustrated with the apex mounted reflector 14 and a hood type parabolic reflector 5a as the collimator 3. This embodiment will produce a wide, flat collimated beam. The preferred form for multiple cervical concentrator collimator arrays is a concentrator 2 having a hexagonal cross-section as shown in FIG. 13. This form permits an array to be formed with an input face that is free of gaps between the concentrators 2. Further variations may be triangular, square, octagonal or similar tapered polygonal shapes and may also include concentrators which increase in breadth or diameter from the input to an intermediate point before tapering to the output, the principal criteria being that the concentrator 2 taper to an output aperture 10 which is smaller than the input and is located within the collimator 3 and that the collimator 3 preferably be a parabolic reflector 5, or portion thereof 5a, positioned over the apex 9 of the concentrator 2 such that the concentrator output is proximate to the focus of the reflector 5.

As previously noted, the cervical concentrator collimator device 1 of this invention is useful in a variety of applications and particularly where a narrow collimated beam of light is desired. FIG. 8 illustrates one application of the device as a self contained collimated light source 15 which emits a narrow spot beam 16. In this embodiment, the concentrator 2 forms the main body of the fixture 15 and includes a reflective member 14 at the apex aperture 10. The collimator 3 is a hood type parabolic reflector 5a. It is noted that any of the previously described embodiments for the cervical concentrator collimator 1 may be employed in this apparatus. Confined within the concentrator 2 is a light source 17 which may be of any type but which is illustrated as a bulb type fluorescent lamp mounted in a toroidal ballast 18. A fluorescent light source is preferred and, depending on the ultimate use, may be a full spectrum white light or a spectral peak source. The threaded neck 19 of the bulb 17 passes through a concave reflector 20 which has a shape and area substantially identical to the base 6 of the concentrator 2. In this manner the concentrator 2 may be completely closed with the light source 17 inside and the only escape for light being the apex aperture 10. Thus, much of the light emitted by the source 17 will be reflected within the concentrator and directed toward the aperture 10 where reflective member 14 will redirect the light rays onto a confined portion of parabolic reflector 5a which will in turn produce a narrow collimated beam of light 16. As noted above, the output beam 16 may be controlled, such as by adjusting reflective member 14.

This embodiment may have particular utility as a light source for projection. The preferred fluorescent source can provide a cool beam and, especially useful for projection video, a beam with power concentrated at selected primary colors.

Specific wavelengths of light may be directed to particular locations by a spectral distributor means used in combination with the cervical concentrator collimator device 1 of this invention to provide those wavelengths from the narrow collimated beam. Such means include the use of a prism 21 or other refractive or diffractive means in the beam path as shown in FIG. 9. By placing such a means in the path of beam 16, the light may be broken into its component wavelengths. In this instance, with the preferred spectral peak light source, the prism 21 breaks beam 16 into the component primary beams red 22, green 23 and blue 24 each of which is itself collimated. To provide such a beam comprising individual selected wavelengths it is preferred to use a spectral peak light source. The light therefrom is concentrated and collimated in the cervical concentrator collimator 1 then passed through a spectral distributor to produce individual collimated beams corresponding to the spectral peak wavelengths. These individual color beams may then be applied to a light valve display means to produce a color image. Furthermore, in the combination of the cervical concentrator collimator and the spectral distributor it is preferred to use a diffraction grating as the spectral distributor to separate the light into its component wavelengths.

FIG. 10 illustrates the cervical concentrator collimator structure of this invention in combination with a display means of the liquid crystal type. The display may, for example, be a conventional liquid crystal display device wherein light from a source is incident on a liquid crystal light valve. The display screen assembly 30 illustrated in FIG. 10, overcomes the problems of conventional screens by a combination of the cervical concentrator collimator of the invention with a spectral peak light source and a spectral distributor thus allowing the color filter means commonly employed to be eliminated. The outputs of an array 29 of cervical concentrator collimator devices 1 are separated into spectra by a spectral distributor 25 so that different portions of the spectrum fall on sub-pixels of a liquid crystal, or other light valve, array 26. This structure increases the efficiency of the display 30 since the particular portions of the spectrum fall only on those light valves or portions of light valves assigned to that color wavelength and color filters normally used to block unwanted wavelengths are eliminated.

In the embodiment illustrated, an array 29 of cervical concentrator collimators 1 receives light from a source 27, in this instance a fluorescent tube preferably emitting light having spectral peaks coincident with the red, green and blue wavelengths. Each cervical concentrator collimator 1 is used to produce a separate collimated beam 16 for each pixel of the light valve array 26. This does not necessarily imply a separate cervical concentrator collimator for each pixel inasmuch as the embodiment of FIG. 6 may be used to produce multiple beams from one device. However, a preferred arrangement is for each cervical concentrator collimator 1 to be associated with one pixel. The array 29 is preferably manufactured by injection molding as one piece from acrylic or polycarbonate then vacuum metallizing the conical and parabolic surfaces so as to be reflective.

It is also preferred that the inputs 6 of the cervical concentrator collimators 1 be as large as possible, generally approximating the display's pixel size, and that the output beams 16 be quite small by comparison. Where a multiple beam cervical concentrator collimator is used, the input should preferably be at least as large as the total pixel area served. For example, a cervical concentrator collimator producing four beams should have an input area equal to four pixels. Preferably, the output beam 16 of each collimator 3 is of a size so as to fall completely within the borders of each sub-pixel of the light valve array 26, since the output beam is to be divided by a spectral distributor 25 into separate beams corresponding to the spectral peak wavelengths of the light source, each beam being collimated, and of the same size as output beam 16. The small output beams 16 are achieved by allowing the outputs of the concentrators 2 to impinge on only limited areas of the collimator surfaces 8 or by otherwise controlling output beam 16 size by controlling aperture 10 size as previously discussed or preferably, by fixing the aperture size at the time of manufacture. Since the spectral peak output beam 16 directed at the spectral distributor 25 is collimated, the individual color beams produced thereby will remain largely collimated although they will diverge from each other as a function of their respective wavelengths.

The dispersion angle from a prism, i.e. the angular difference between the red and blue beams of a spectrum, is typically quite small, about 1.25°. The small dispersion angle of a prism array allows beam angles fairly normal to the plane of the display 30 especially where the cervical concentrator collimators may be slightly canted relative to the horizontal plane of the display assembly 30 to allow for the prism refraction angle. However, it also requires a great distance between the prism array and the light valve array in order to obtain good separation of the color wavelengths for impingement on the light valves. In contrast, a diffraction grating, which can distribute a spectrum at a wide angle, about 25°, is more practical for most applications, particularly flat panel LCD display screens, since it permits the cervical concentrator collimator array 29 to be placed closer to the light valve array 26 yet still obtain good separation of the desired wavelengths. Additionally, diffraction gratings can be made considerably thinner than prism arrays which further contributes to the reduction of the thickness of the display screen assembly 30. For example, where the cervical concentrator collimator devices 1 are fabricated as solid elements the diffraction grating can be applied to or molded as part of the output face of the collimator section 8. There are some special considerations which arise when diffraction gratings are used, primarily the correction of the wider dispersion angle. Thus, the spectral distributor 25 is preferably a diffraction grating with an additional optical array 28 positioned between the spectral distributor 25 and the light valve array 26 as a renormalizer for the light beams 22, 23 and 24 which in most instances will correspond to the primary colors red, green and blue, respectively. The renormalizing optical array 28 may be a plurality of lenses or prisms molded in a single piece to be assembled with the cervical concentrator collimator array 29 so that the renormalizer elements coincide with the diffracted output beams to correct their ray angles and present the beams 22, 23 and 24 at an angle normal to the display assembly 30. Where beam colors other than red, green and blue are desired, the spectral peak light source will be selected with the desired color wavelengths as its peaks and the diffraction grating will thus separate beam 16 into one or more color beams corresponding to those wavelengths.

Because a diffraction grating may produce several orders of spectra from one set of rays any unwanted spectra may be blocked or suppressed by several well known means. Alternatively, higher order spectra from one pixel may be used to reinforce spectra from adjacent pixels thus allowing a single white beam to provide spectra to several pixels. Where a single white beam provides several spectra, the concentrator input should be larger than pixel size. This should also be the case where several white beams are produced from one concentrator, ie. the FIG. 6 embodiment.

If the light source produces a continuous spectrum, the display is less efficient since each light valve must select only part of the spectrum presented to it. This is necessary to assign reasonably pure primary colors thus allowing good color control. Previous methods have employed filters to remove unwanted wavelengths, however, these filters also reduce the light quantity presented to the light valves and, hence, the brightness of the image produced by the display. The spectral screen herein using a spectral peak light source in combination with the cervical concentrator collimator devices 1 of this invention and spectral distributors 25 as herein described can produce full color and a brighter image while at the same time eliminating the need for color filters. The preferred spectral peak light source is far more efficient and assigned colors may fall within the light valve apertures as primary color rather than being defined by those apertures. A spectral peak light source also reduces the degree of dispersion of each color beam exiting the spectral distributor 25 allowing a more precise alignment of the beams with the light valve array 26. Thus, the preferred assembly of the display 30 of FIG. 10 comprises a light source 27 in the form of a spectral peak light source wherein the peaks correspond to the ultimately desired wavelengths, the cervical concentrator collimator array 29, the spectral distributor 25 in the form of a diffraction grating, renormalizing optical array 28 and light valve array 26 which is preferably an LCD array. Furthermore, the arrangement described may be used in combination with active or passive displays from liquid crystal displays to transparencies comprising black and gray dots which may be viewed in color when in correct register with the spectral array. Similarly, the cervical concentrator collimator 1 apparatus of this invention may be used without the spectral distributor 25 and renormalizing optical array 28 in a display with color filters or where multiple colors are not required such as in a black and white or monochrome display. In such a display, the output beam 16 of each collimator 3 in the cervical concentrator collimator array 29 will preferably be narrow so as to be directly incident on a single light valve within light valve array 26.

Furthermore, it has been previously noted that the present invention provides improvements in light quantity and image quality in display screens without increasing electrical power requirements over those of currently available systems. Indeed, power requirements in thin panel displays may even be reduced from those of current systems without degradation in image quality. By eliminating the need for color filters, the present invention reduces the amount of light lost by absorption or blockage by such filters and, thereby, provides a brighter output from an equivalent light source than is achieved by displays relying thereon.

As seen in FIG. 10, the present invention provides an effective means for collimating distributed diffuse light which has not, as far as is known by applicant, previously been accomplished. The collimating device including light source 27 and the array 29 of collimating elements 1 can be used independently of spectral distribution 25 and renormalizing optical array 28 for illuminating any type of light valve array 26. The collimating device is especially useful for a plurality of light sources 27 with a multiplicity of collimator elements in the array 29, wherein the additional light sources and collimator elements are arranged, for example, parallel to light source 27 and collimator elements 1 (in the direction perpendicular to the plane of the figure).

While the invention has been described with reference to the preferred embodiments thereof it will be appreciated by those of ordinary skill in the art that changes can be made to the structure and methods disclosed without departing from the spirit and scope of the invention.

I claim:

1. A combination light concentration and collimation apparatus comprising
    a non-imaging light concentrator comprising an internally reflective body having an axis therethrough and having a polygonal cross-section in a plane perpendicular to its axis and having an input end and an output end; and,
    a light collimator having an input end and an output end;
    wherein the output end of said concentrator is smaller than the input end of said collimator and is proximate to a focus of said collimator.

2. The apparatus of claim 1 wherein said internally reflective body has a hexagonal cross-section in a plane perpendicular to its axis.

3. A combination light concentration and collimation apparatus comprising
    a non-imaging light concentrator comprising a shaped internally reflective body having the shape of an elongated trough comprising a pair of opposed elongated side walls and having an input end and an output end; and,
    a light collimator having an input end and an output end;
    wherein the output end of said concentrator is smaller than the input end of said collimator and is proximate to a focus of said collimator.

4. The apparatus of claim 3 wherein said light collimator comprises a parabolic surface extending from an elongated sidewall of said trough and extending over and beyond the output end of said trough.

5. A combination light concentration and collimation apparatus comprising
    a non-imaging light concentrator comprising a shaped internally reflective body having the shape of an elongated trough comprising a pair of opposed elongated side walls and having an input end and an output end; and,
    a light collimator having an input end and an output end;
    wherein said light collimator comprises a pair of parabolic surfaces extending from each of said elongated sidewalls of said trough to thereby confine the output end of said trough therebetween;
    wherein the output end of said concentrator is smaller than the input end of said collimator and is proximate to a focus of said collimator.

6. A combination light concentration and collimation apparatus comprising
    a non-imaging light concentrator comprising an internally reflective body having an input end and an output end; and
    a light collimator having an input end and an output end;
    wherein the output end of said concentrator is smaller than the input end of said collimator and is proximate to a focus of said collimator and said internally reflective body has a base forming the input end of said light concentrator, and an apex, said body further comprising an aperture in a sidewall thereof and adjacent said apex, whereby the concentrated beam of light rays formed within said body exits said body at the output end thereof through said aperture.

7. A light beam concentration and collimation apparatus comprising,
    a light concentrator comprising an internally tapered body having a base forming a light inlet, and an apex, said body having an aperture in a side wall thereof adjacent said apex, said aperture forming an outlet for light entering said light concentrator;
    a light collimator comprising a reflective curved surface having an input end for receiving light passing through the aperture of said light concentrator and an output end, wherein the aperture is proximate with a focus of the light collimator; and
    a reflective member positioned at said aperture whereby light passing through the light concentrator is intercepted and directed through the aperture to strike the reflective curved surface of the collimator.

8. The apparatus of claim 7 wherein the tapered body has a longitudinal axis and wherein said reflective member comprises a planar mirror positioned at an angle relative to the longitudinal axis of the tapered body.

9. A combination light concentration and collimation apparatus comprising
    a non-imaging light concentrator comprising an internally reflective body and having an input end and an output end; and,
    a light collimator having an input end and an output end;
    wherein the output end of said non-imaging light concentrator is smaller than the input end of said collimator and is proximate to a focus of said collimator and comprises at least two apertures.

10. The apparatus of claim 9 wherein said at least two apertures are circumferentially spaced about the output end of the light concentrator.

11. The apparatus of claim 9 wherein said light collimator comprises a parabolic reflecting surface for each said aperture.

12. A combination light concentration and collimation apparatus comprising
    a plurality of non-imaging light concentrators each comprising an internally reflective body having an input end and an output end; and,
    a plurality of light collimators each having an input end and an output end;
    wherein the plurality of said light concentrators and the plurality of light collimators are joined to form an array and wherein the output end of each said concentrator is smaller than the input end of said associated collimator and is proximate to a focus of said collimator.

13. The apparatus of claim 12 further comprising a light source, the output of which is directed to the input end of said plurality of light concentrators.

14. The apparatus of claim 12 wherein each non-imaging light concentrator comprises an internally reflective body having a longitudinal axis and having a polygonal cross-section in a plane perpendicular to said axis.

15. The apparatus according to claim 14 wherein said internally reflective body has a hexagonal cross-section in a plane perpendicular to its axis.

16. The apparatus according to claim 12 wherein each non-imaging light concentrator comprises an internally reflective body in the form of an elongated trough comprising a pair of opposed elongated side walls.

17. The apparatus according to claim 16 wherein each collimating element comprises a pair of parabolic surfaces extending from each of said elongated sidewalls of said trough to thereby confine the output end of said trough therebetween.

18. The apparatus according to claim 12 wherein said internally reflective body has a base forming the input end of said light concentrator, and an apex, said body further comprising an aperture in a sidewall thereof and adjacent said apex, whereby the concentrated beam of light rays formed within said body exits said body at the output end thereof through said aperture.

19. The apparatus according to claim 18 wherein said aperture is located proximate to a focus of said light collimator, whereby light passing through said aperture strikes said collimating element and is redirected as a collimated beam of light.

20. The apparatus according to claim 12 wherein each non-imaging light concentrator comprises an internally tapered body having a base forming a light inlet, and an apex, said body having an aperture in a side wall thereof adjacent said apex, said aperture forming an outlet for light entering said light concentrator; and each collimating element comprises a reflective curved surface having an input end for receiving light passing through the aperture of said light concentrator and an output end, wherein the aperture is proximate with a focus of the collimating element; and, further comprising a reflective member positioned at said aperture whereby light passing through the light concentrator is intercepted and directed through the aperture to strike the reflective curved surface of the collimating element.

21. The apparatus of claim 20 wherein said tapered body has a longitudinal axis and wherein said reflective member comprises a planar mirror positioned at an angle relative to the longitudinal axis of said tapered body.

22. A device for producing collimated light from an extended diffuse light source, comprising an extended diffuse light source, an array of collimating elements disposed to receive and largely collimate the diffuse light emanating from said light source, said array comprising a plurality of light concentrating and collimating elements, said elements each comprising (1) an internally reflecting light concentrating body having a relatively wide base providing an inlet for receiving the diffuse light emanating from the diffuse light source and a relatively narrow outlet defining an opening through which the concentrated diffuse light formed while passing through the concentrating body from the base to the outlet exits the concentrating body and (2) a light collimator comprising a reflective curved surface extending from said light concentrating body and over the opening at the outlet thereof, said opening being located proximate to the focus of the reflective curved surface, whereby the light passing through the concentrating body and exiting from the light collimator is largely collimated.

23. A method for minimizing and largely collimating light from an extended diffuse light source comprising passing light from the light source through an array of non-imaging concentrators whereby the light entering each concentrator has a first cross-sectional area and the light exiting from each concentrator has a second cross-sectional area such that the second cross-sectional area is smaller than the first cross-sectional area and collimating the light exiting from the array of concentrators.

24. A device for providing collimated light from an extended diffuse light source comprising, an extended diffuse light source and, an array of collimating elements having a given depth, and disposed to receive and largely collimate the diffuse light from said light source passing therethrough in a direction through the depth of said collimating elements and, the array having a given breadth and wherein the depth through the collimating elements is less than the breadth of the array, whereby light from the extended diffuse light source passing through the collimating elements will exit from the collimating elements as collimated light.

25. A device for providing collimated light from an extended diffuse light source comprising, an extended diffuse light source and, an array of collimating elements having a given depth, and disposed to receive and largely collimate the diffuse light from said light source passing therethrough in a direction through the depth of said collimating elements and, the array having a given breadth and wherein the depth through the collimating elements is less than the breadth of the array, said device further comprising an array of non-imaging light concentrators each comprising an internally reflective body having an input end and an output end;

wherein the output end of each said concentrator is proximate to a focus of a collimator in said array of collimating elements and is smaller than the input end of said collimator.

26. A device according to claim 25 wherein each non-imaging light concentrator comprises an internally reflective body having a longitudinal axis and a polygonal cross-section in a plane perpendicular to said axis.

27. A device according to claim 26 wherein said internally reflective body has a hexagonal cross-section in a plane perpendicular to its axis.

28. A device according to claim 25 wherein each non-imaging light concentrator comprises an internally reflective body in the form of an elongated trough comprising a pair of opposed elongated side walls.

29. A device according to claim 28 wherein each collimating element comprises a pair of parabolic surfaces extending from each of said elongated sidewalls of said trough to thereby confine the output end of said trough therebetween.

30. A device according to claim 25 wherein said internally reflective body has a base forming the input end of said light concentrator, and an apex, said body further comprising an aperture in a sidewall thereof and adjacent said apex, whereby the concentrated beam of light rays formed within said body exits said body at the output end thereof through said aperture.

31. A device according to claim 30 wherein said aperture is located proximate to a focus of said light collimator, whereby light passing through said aperture strikes said collimating element and is redirected as a collimated beam of light.

32. A device according to claim 25 wherein each nonimaging light concentrator comprises an internally tapered body having a base forming a light inlet, and an apex, said body having an aperture in a side wall thereof adjacent said apex, said aperture forming an outlet for light entering said light concentrator; and each collimating element comprises a reflective curved surface having an input end for receiving light passing through the aperture of said light concentrator and an output end, wherein the aperture is proximate with a focus of the collimating element; and, further comprising a reflective member positioned at said aperture whereby light passing through the light concentrator is intercepted and directed through the aperture to strike the reflective curved surface of the collimating element.

33. The device of claim 32 wherein said tapered body has a longitudinal axis and wherein said reflective member comprises a planar mirror positioned at an angle relative to the longitudinal axis of said tapered body.

34. A device for providing collimated light from an extended diffuse light source comprising, an extended diffuse light source and, an array of collimating elements having a given depth, and disposed to receive and largely collimate the diffuse light from said light source passing therethrough in a direction through the depth of said collimating elements and, the array having a given breadth and wherein the depth through the collimating elements is less than the breadth of the array;

wherein the individual collimating elements of said array are so disposed with respect to said extended diffuse light source that light emanating from a point on said light source may be collimated by two or more adjacent collimating elements.

* * * * *